US00RE38326E

(19) United States
(12) Reissued Patent
Mapp

(10) Patent Number: US RE38,326 E
(45) Date of Reissued Patent: Nov. 25, 2003

(54) MOLDED PLASTIC RAMP

(76) Inventor: Michael Mapp, 14855 Persistence Dr., Woodbridge, VA (US) 22191

(21) Appl. No.: 09/946,610

(22) Filed: Sep. 6, 2001

Related U.S. Patent Documents

Reissue of:
(64) Patent No.: 5,946,756
Issued: Sep. 7, 1999
Appl. No.: 08/800,981
Filed: Feb. 14, 1997

(51) Int. Cl.[7] ..... E01D 1/00; A63C 19/10
(52) U.S. Cl. ..... 14/69.5; 472/88; 472/89; 472/90
(58) Field of Search ..... 14/69.5; 472/88–90; D34/32; 188/32; 446/168, 429, 444, 435; 463/69; 414/227, 921; 119/847; 254/88

(56) References Cited

U.S. PATENT DOCUMENTS 2,426,058 A * 8/1947 Scogland
3,032,343 A * 5/1962 Freeberg
3,634,961 A * 1/1972 Nawalaniec
3,663,015 A * 5/1972 Bynder et al.
D246,638 S * 12/1977 Hegedus
4,129,916 A * 12/1978 Schlesinger et al.
D257,874 S * 1/1981 Sheehan et al.
4,285,514 A * 8/1981 Romero
4,476,961 A * 10/1984 Luigi
4,582,176 A * 4/1986 Roberts
4,649,724 A * 3/1987 Raine
4,781,271 A * 11/1988 Wokeck
5,033,146 A * 7/1991 Fogarty et al.
5,247,162 A * 9/1993 Swartz et al.
5,267,367 A * 12/1993 Wegmann, Jr.
5,289,830 A * 3/1994 Levine
D346,256 S * 4/1994 Thomas, III et al.
D353,930 S * 12/1994 Johnson
5,483,715 A * 1/1996 Fogarty et al.
5,524,310 A * 6/1996 Farnen
5,552,768 A * 9/1996 Mikiel et al.
5,586,621 A * 12/1996 Moon et al.
5,599,235 A * 2/1997 Lynberg

OTHER PUBLICATIONS

"Thrasher", Jun. 1996, p. 62–63.*
A blueprint created in 1996 titled "2' Launch Ramp".

* cited by examiner

*Primary Examiner*—Heather Shackelford
*Assistant Examiner*—Sunil Singh
(74) *Attorney, Agent, or Firm*—H. Jay Spiegel

(57) ABSTRACT

A molded plastic ramp is made in a one-step molding process. The ramp includes reinforced side and rear walls and a smooth radiused ramp surface. The ramp includes laterally extending side and rear supports that engage a ground surface and the forward portion of the ramp surface extends forward of the forward extent of the side supports.

46 Claims, 3 Drawing Sheets

MOLDED PLASTIC RAMP

Matter enclosed in heavy brackets [ ] appears in the original patent but forms no part of this reissue specification; matter printed in italics indicates the additions made by reissue.

BACKGROUND OF THE INVENTION

The present invention relates to a molded plastic ramp. In the prior art, ramps are known, however. Applicant is unaware of any ramp structure including all of the features and aspects of the present invention.

The following prior art is known to Applicant:

U.S. Pat. No. 3,023,343 to Freeberg

U.S. Pat. No. 3,663,015 to Bynder et al.

U.S. Pat. No. 4,129,916 to Schlesinger et al.

U.S. Pat. No. 4,285,514 to Romero

U.S. Pat. No. 5,033,146 to Fogarty et al.

U.S. Pat. No. 5,267,367 to Wegmann, Jr.

U.S. Pat. No. 5,483,715 to Fogarty et al.

U.S. Pat. No. 5,524,310 to Farnen

U.S. Design Pat. No. 246,638 to Hegedus

U.S. Design Pat. No. 257,874 to Sheehan et al.

U.S. Design Pat. No. 346,256 to Thomas, III et al.

U.S. Design Pat. No. 353,930 to Johnson.

In Freeberg, the ramp surface is convex as compared to the concave radiused ramp surface of Applicant's invention. Furthermore, Freeberg lacks the side and rear reinforcements disclosed herein.

Bynder et al. teach a bike jump. However, the pointed forward end thereof differs from the present invention. Furthermore, the ramp surface of Bynder et al. is flat.

Schlesinger et al. disclose an adjustable skateboard ramp having a radiused surface. The Schlesinger et al. device is not made in one-piece but, rather, consists of a complicated framework that must be assembled together. Furthermore, the ramp surface extends almost vertically and no side reinforcements are provided.

Romero teaches a ramp device for practicing wheeled sports. The present invention differs from the teachings of Romero as contemplating a one-piece molded ramp structure having reinforced side walls and supports extending laterally outwardly from the side and rear walls thereof.

Fogarty et al. '146 teach a vehicle service ramp that includes a separate reinforcing structure. In Applicant's invention, the ramp surface is radiused and the reinforcement is integral with the ramp.

Wegmann, Jr. teach a safety ramp and method for protecting hoses and conduits. The ramp surface of Wegmann, Jr. is not radiused and has a textured surface to provide traction. No side reinforcing means are contemplated therein.

Fogarty et al. '175 teach a service ramp that includes a flat textured ramp surface and reinforcing means within a chamber formed underneath the ramp. In the present invention, all of the reinforcing means are integrated into the side and rear walls thereof and the ramp surface is smooth and radiused.

Farnen teaches a modular halfpipe skateboard ramp and method of constructing. In Farnen, the ramp surface is radiused but extends about one-fourth of a circular revolution. Furthermore, Farnen teaches a constructed ramp made of several component parts assembled together. In contrast, the present invention comprises a single one-piece molded piece of plastic with reinforcements built into the walls thereof.

Hegedus teaches a bicycle ramp having a flat ramp surface with support legs at the rear thereof. The present invention differs from the teachings of Hegedus as teaching a one-piece molded plastic ramp having reinforcements built into the side walls and a radiused ramp surface.

Sheehan et al. teach a skateboard ramp having a variably radiused surface and including support legs mounted on the side walls thereof. The present invention differs from the teachings of Sheehan et al. as contemplating a one-piece molded ramp having a radiused surface and integral reinforcements in the side and rear walls thereof.

Thomas, III et al. teach an access ramp for handicapped persons including a flat ramp surface with projections extending upwardly thereof for traction. The present invention differs from the teachings of Thomas, III et al. as contemplating a one-piece molded ramp having a radiused smooth ramp surface with side walls having reinforcements built therein and with the forward edge of the ramp surface extending forwardly of side supports therefor.

Johnson teaches a jump ramp for wheeled vehicles. The Johnson ramp includes elongated rib-like reinforcements on the underside. Furthermore, Johnson includes a textured flat ramp surface with a forward edge that is spaced upwardly from a ground surface. The present invention differs from the teachings of Johnson as contemplating a radiused smooth ramp surface with side walls with built-in reinforcements and with the forward edge of the ramp being flush with a ground surface.

Ramps are also made of wood using plywood and elongated wood pieces to fabricate such a ramp. Such ramps are heavy and cumbersome and, when exposed to adverse weather conditions, quickly deteriorate.

It is with the problems of the prior art in mind that the present invention was developed.

SUMMARY OF THE INVENTION

The present invention relates to a molded plastic ramp. The present invention includes the following interrelated objects, aspects and features:

1. In a first aspect, the present invention is made in a onestep molding process. In the preferred mode of construction, the technique of vacuum forming is employed due to its relative economy as compared to injection molding. Due to the relatively large size of the inventive ramp as compared to small plastic parts that are commonly injection molded, the use of vacuum forming can result in large financial savings. The present invention is specifically designed to more than withstand anticipated forces when made in a vacuum forming process.

2. The inventive ramp includes side and rear walls with built-in reinforcements. The reinforcements consist of depressions in the outer walls thereof that are seen, in the underside, as projections. In other words, these depressions extend completely through the material and act as reinforcing ribs. In the preferred embodiment, three such depressions are formed in each of the side walls and the rear wall. To facilitate the vacuum forming process, the side wails may be slightly angled outwardly from the ramp surface toward the bottom edge thereof.

3. The ramp surface itself is radiused to provide a gentle curve from the bottom to the top thereof. In one embodiment, the curvature of the ramp is that of a 9' radiused circle. The length of the ramp approximates about 5% of the circumference of such a circle, as such, the top of the ramp, at its rearward edge, does not present a sharp upward angle to the user. The ramp surface is smooth and untextured to provide minimal friction with the wheels of the user's vehicle such as, for example, a skateboard or rollerblades or other wheeled vehicle.

4. A support structure is provided for the present invention including laterally extending supports that extend rearward of the rear wall and laterally of the side walls. The undersides of these supports may be coated with a ground gripping material such as, for example, a roughened rubber material. The forward edge of the ramp surface extends forwardly of the forward extent of the lateral supports extending laterally from the side walls. In this way, the forward lip of the ramp surface provides direct transition from the adjacent ground surface to the ramp surface without a "bump".

5. In the preferred embodiment of the present invention, the inventive ramp is made of a hard, strong plastic material such as, for example, Acrylonitrile Butadiene Styrene, otherwise known as "ABS" plastic. Other hard, strong plastic materials may be substituted such as, for example, thermal plastics or polycarbonates, however, "ABS" plastic was chosen for its combination of strength, aesthetics and economy.

Accordingly, it is a first object of the present invention to provide a molded plastic ramp.

It is a further object of the present invention to provide such a ramp made in a one-step molding process.

It is a still further object of the present invention to provide such a ramp wherein the molding process comprises vacuum forming.

It is a still further object of the present invention to provide such a ramp including a smooth radiused ramp surface having a forward edge flush with an adjacent ground surface.

It is a still further object of the present invention to provide such a ramp with side walls and a rear wall including built-in reinforcements.

It is a set further object of the present invention to provide such a ramp with laterally extending support surfaces for the side walls and rear walls.

These arid other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
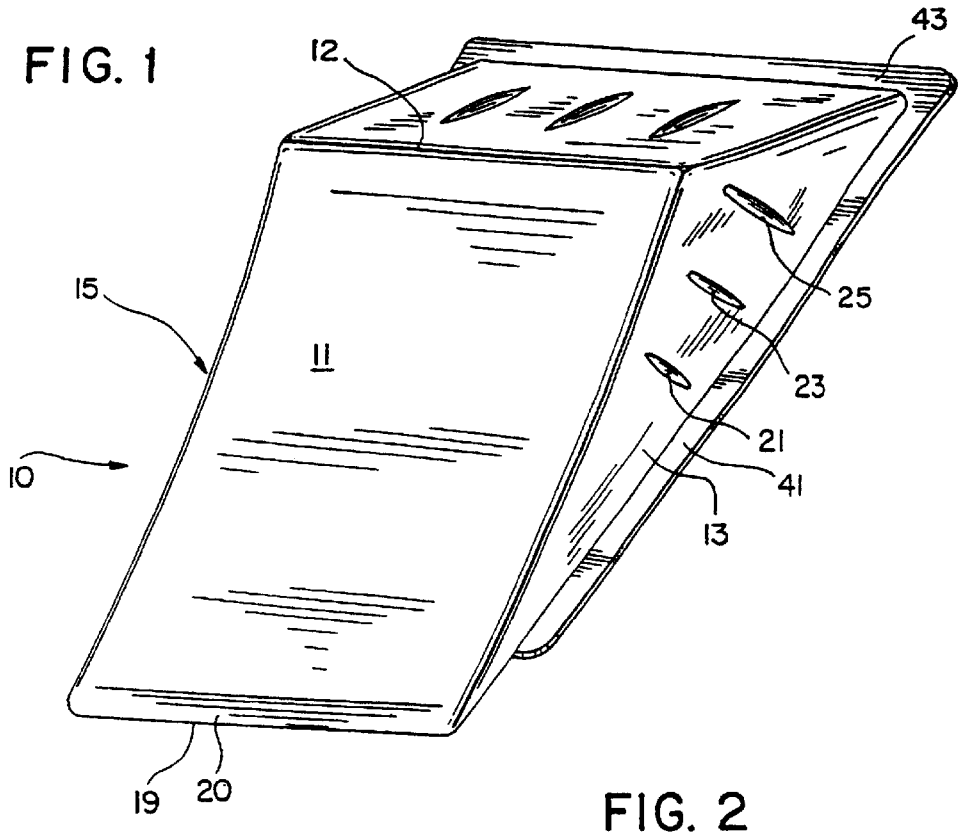
FIG. 1 shows a front perspective view of the present invention.
Figure 2:
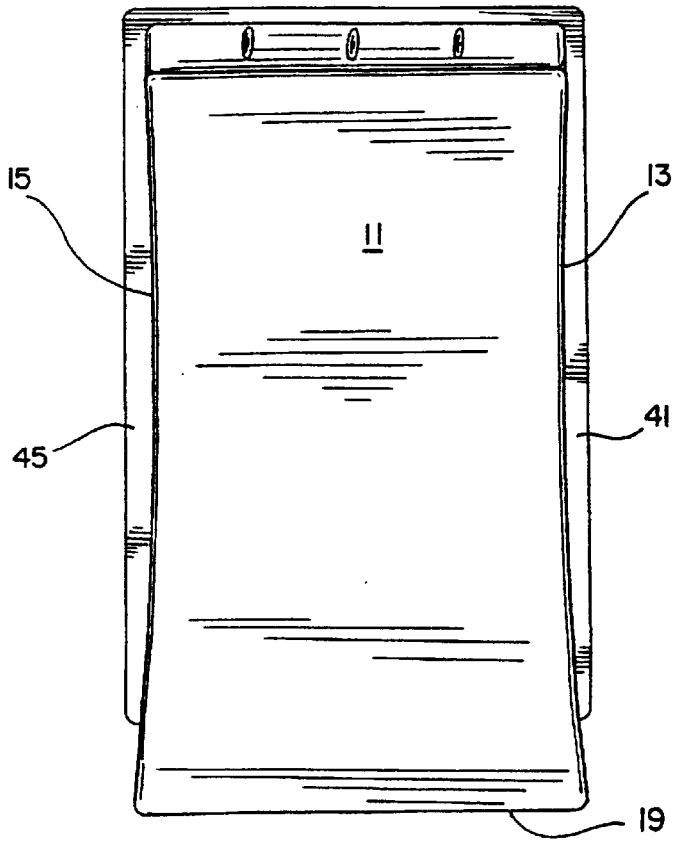
FIG. 2 shows a [front] *top* view of the present invention.

The present invention is generally designated by the reference numeral 10 and is seen to include a smooth radiused ramp surface 11, side walls 13 and 15, and a rear wall 17. The ramp surface 11 includes a forward edge 19 that extends down to the bottom-most extent of the device 10 so that when the device 10 is placed on a flat ground surface, the edge 19 is substantially flush with the ground surface so that users have a smooth transition from the ground surface to the ramp surface 11 especially where small-wheeled vehicles such as skateboards and inline skates are used. The ramp surface preferably extends in a substantially uniform width from the forward edge 19 to the rear edge 12.

Figure 3:
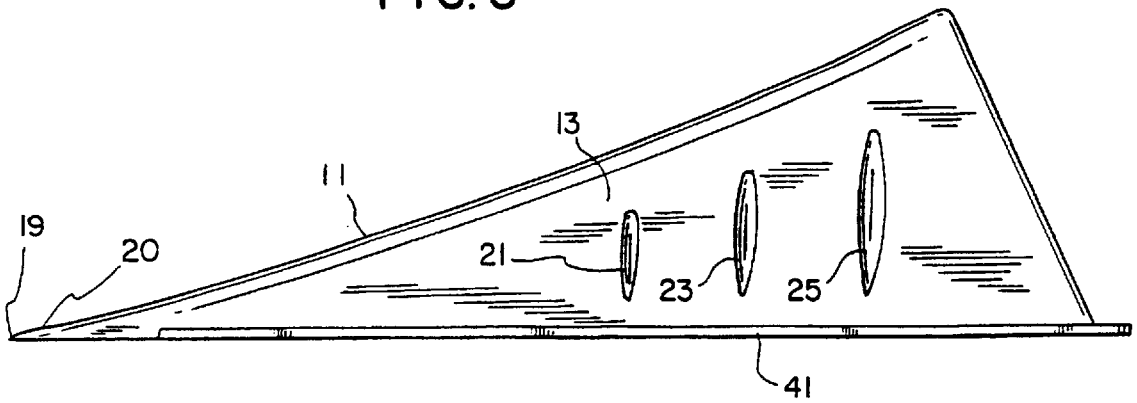
FIG. 3 shows a side view of the present invention.
Figure 5:
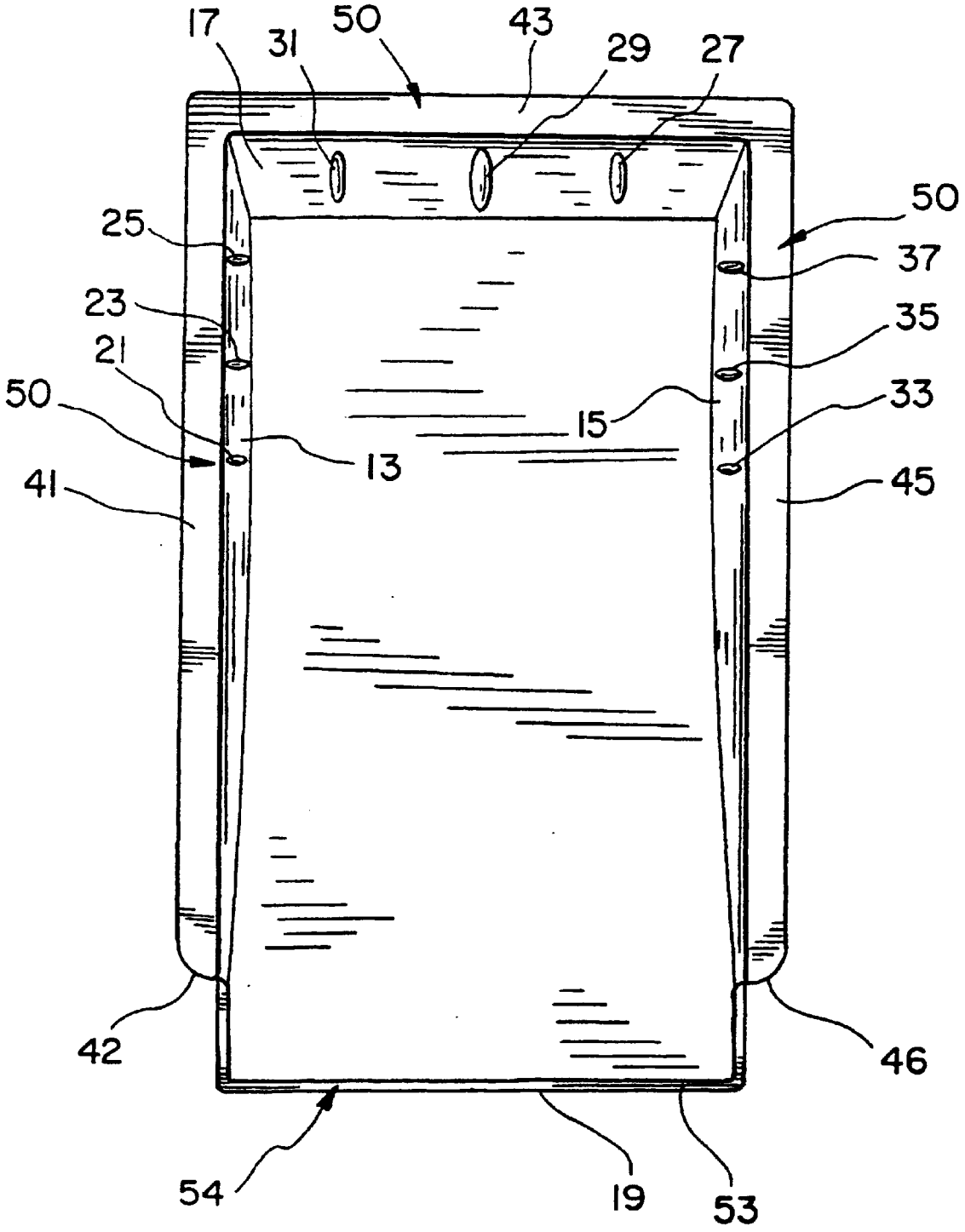
FIG. 5 shows a bottom view of the present invention.

As seen in the figures, each of the side walls 13, 15 and the rear wall 17 are integrally reinforced. Thus, the side wall 13 includes depressions 21, 23 and 25 that comprise reinforcing ribs strengthening the side wall 13. These depressions are best seen in FIGS. 1 and 3. With reference to FIG. 5, these depressions 21, 23, 25 extend completely through the material of the side wall 13 and, as seen in FIG. 5, are visible as protrusions with the same numbers being employed as are employed in FIGS. 1 and 3 since these are the same structures and FIG. 5 merely shows the other side of them.

Figure 4:
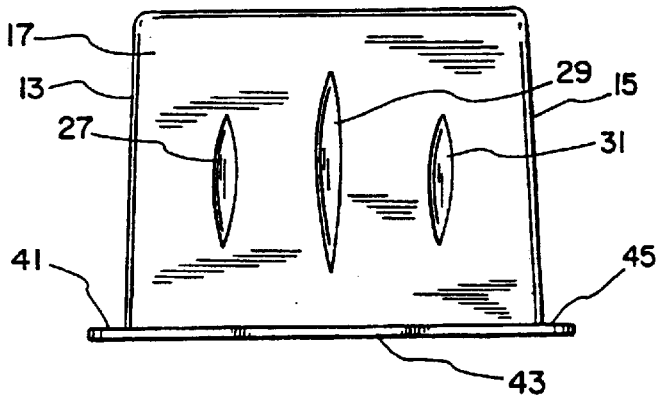
FIG. 4 shows a rear view of the present invention.

Similarly, with reference to FIG. 4, the rear wall 17 includes reinforcements consisting of depressions 27, 29 and 31 which, as best seen in FIG. 5, extend completely through the material of the rear wall 17 and comprise protrusions identified with the same reference numerals as used in FIG. 4. The reinforcing means for the side wall 15 are seen in FIG. 5 as the protrusions 33, 35 and 37 and their appearance on the outside of the wall 15 corresponds, symmetrically, to that of the wall 13 as seen in FIGS. 1 and 3.

Extending laterally outwardly from the side walls 13, 15 and rearwardly of the rear wall 17 are lateral supports 41, 43 and 45 that, as best: seen in FIG. 5, are suitably coated with a gripping material such as a roughened rubber coating generally designated by the reference numeral 50. As clearly seen in FIG. 5, the lateral support 41, 43 and 45 extend from outwardly of the outer surfaces of the walls 13, 15 and 17 to a location coinciding with the inner surfaces of the walls 13, 15 and 17. As also seen in FIG. 5, the underside of the front edge 19 of the ramp surface 11 comprises a surface 53 that is coated with a similar roughened rubber material designated by the reference numeral 54.

As should now be understood from FIG. 5, when the inventive ramp 10 is supported on a flat ground surface, the ramp 10 is supported on the surfaces 41, 43, 45 and 53. Spacing of the front edge 19 of the ramp surface 11 forwardly of the forward extents 42 and 46 of the respective support surfaces 41 and 45 provides the user an unimpeded, unobstructed, smooth transition from the ground surface to the ramp 11. If desired, immediately rearward of the front edge 19) of the ramp surface 11, a transition surface 20 may be provided that is unradiused to provide sufficient thickness to provide structural integrity to the surface 53 underneath.

If desired, and to facilitate the vacuum forming process, the walls 13 and 15 may be slightly angled outwardly from adjacent the peak 12 of the ramp surface 11 to the lateral supports 41, 45. Such angling facilitates removal of the finished ramp from its mold. Furthermore, after molding is complete, the material forward of the front edge 19 is trimmed away to form the front edge using any desired means such as, for example, a conventional saw, a computerized router or a laser saw.

By devising a ramp wherein the reinforcements therefor may be located solely on the side and rear walls thereof, and by making the ramp of a lightweight plastic material in an inexpensive process, the inventive ramp may be sold for a price that is appealing to consumers and may be shipped inexpensively as compared to prior art ramps. Furthermore, elimination of the need to texture or reinforce the ramp surface 11 renders the inventive device 10 aesthetically pleasing to the end user. In the preferred embodiment, the raw material that is vacuum formed is about 0.36 inches in thickness. Of course, the starting thickness is chosen based upon anticipated loading.

In the preferred embodiment, the ramp surface 11 comprises an arcuate surface having a constant radius, for example, that of a 9' radiused circle. Such a surface comprises a part-cylinder. Of course, other desired radiuses may be employed and, if desired, the radius may be varied along the ramp. However, it is an essential part of the present invention to provide the ramp surface 11 as a radiused surface.

As explained above, in the preferred embodiment of the present invention, the inventive pump 10 is made of a lightweight, strong, aesthetically pleasing and inexpensive plastic such as, for example, "AES" plastic. Other plastics that are substantially equivalent in these factors may also be employed. Also materials such as reinforced fiberglass may be used.

As such, an invention has been disclosed in terms of a preferred embodiment thereof which fulfills each and every one of the objects of the invention as set forth hereinabove and provides a new and useful molded plastic ramp of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A one-piece molded ramp, comprising:

a) a smooth radiused concave ramp surface extending from a laterally elongated forward edge to a laterally elongated rear edge;

b) side walls extending downwardly from lateral edges of said ramp surface and a rear wall extending downwardly from said rear edge of said ramp surface;

c) each of said side walls and rear wall including integral reinforcement; and d) lateral supports extending laterally of each side wall and rearwardly of said rear wall, said forward edge of said ramp surface extending forward of said side wall lateral supports;

e) said forward edge of said ramp surface comprising a lowermost structure of said ramp.

2. The ramp of claim 1, wherein said ramp surface comprises a part cylinder.

3. The ramp of claim 1, wherein said integral reinforcement comprises a plurality of elongated depressions in each of said side walls and rear wall.

4. The ramp of claim 3, wherein said depressions extend completely through said walls, appearing as projections or ribs on an undersurface of said walls.

5. The ramp of claim 1, wherein said ramp surface has a constant radius.

6. The ramp of claim 5 wherein said constant radius comprises that of a 9' radius circle.

7. The ramp of claim 1, wherein said lateral supports have an undersurface covered with a ground surface gripping material.

8. The ramp of claim 7, wherein said material comprises rubber.

9. The ramp of claim 7, wherein an undersurface of said forward edge of said ramp surface is covered with said material.

10. The ramp of claim 1, made of vacuum formed plastic.

11. The ramp of claim 10, wherein said plastic comprises ABS plastic.

12. The ramp of claim 1, wherein said ramp surface has a substantially uniform width from said forward edge to said rear edge.

13. A one-piece ABS plastic molded ramp, comprising:

a) a smooth, constantly radiused concave, part cylindrical ramp surface extending from a laterally elongated forward lowermost edge to a laterally elongated rear edge;

b) side walls extending downwardly from lateral edges of said ramp surface and a rear wall extending downwardly from said rear edge of said ramp surface;

c) each of said side walls and rear wall including integral reinforcement comprising a plurality of elongated depressions; and d) lateral supports extending laterally of each side wall and rearwardly of said rear wall and having undersurfaces coated with rubber, said forward edge of said ramp surface extending forward of said side wall lateral supports;

said forward lowermost edge comprising a lowermost structure of said ramp.

14. The ramp of claim 13, wherein said depressions extend completely through said walls, appearing as projections or ribs on an undersurface of said walls.

15. The ramp of claim 13, wherein said constant radius comprises that of a 9' circle.

16. The ramp of claim 13, wherein an undersurface of said forward edge of said ramp surface is covered with rubber.

17. A one-piece hollow molded *skate and skateboard* ramp, comprising:

a) a smooth radiused concave thin-walled ramp surface extending *in a direction of extent perpendicularly* from a laterally elongated sharp forward edge to a laterally elongated rear edge; and b) thin-walled side walls extending downwardly adjacent lateral edges[;] of said ramp surface and a thin-walled rear wall extending downwardly from said rear edge of said ramp surface;

c) said forward edge comprising a lowermost structure of said ramp; [and]

d) said ramp made of hard plastic*; and*

*e) said ramp surface being accessible via said forward edge by a skate or skateboard sized to support an adult human being and moving in a direction aligned with said direction of extent of said ramp surface.*

18. The ramp of claim 17, wherein said ramp surface comprises a part cylinder.

19. The ramp of claim 17, made of vacuum formed plastic.

*20. A one-piece molded ramp, comprising:*

*a) a ramp surface including a smooth radiused laterally elongated concave portion extending to a rear termination, said ramp surface having lateral terminations;*

*b) side walls extending downwardly from said lateral terminations and a rear wall extending downwardly from said rear termination;*

*c) each of said side walls and rear wall being reinforced;*

*d) lateral supported extends laterally of each side wall and rearwardly of said rear wall, a forward edge of said ramp surface extending forward of said side wall lateral supports;*

*e) said forward edge of said ramp surface comprising a lowermost structure of said ramp and allowing access to said ramp surface;*

*f) said portion of said ramp surface having a forward termination rearward of said forward edge and forward of said rear termination.*

*21. The ramp of claim 20, wherein said ramp surface has a substantially uniform width.*

*22. The ramp of claim 20, wherein said ramp is made of plastic.*

*23. The ramp of claim 22, wherein said plastic comprises ABS plastic.*

*24. The ramp of claim 22, wherein said plastic comprises vacuum formed plastic.*

*25. The ramp of claim 20, wherein said ramp surface comprises a part cylinder.*

*26. The ramp of claim 25, wherein said ramp surface has a constant radius of about 9'.*

*27. The ramp of claim 20, wherein said lateral supports have an undersurface covered with a gripping material.*

*28. The ramp of claim 27, wherein said gripping material comprises rubber.*

*29. A one-piece molded skate and skateboard ramp, comprising:*

*a) a ramp surface including a laterally elongated concave thin-walled portion extending to a rear termination, said ramp surface having lateral terminations, said portion of said ramp surface being smoothly radiused throughout a length thereof;*

*b) thin-walled side walls extending downwardly adjacent said lateral terminations and a thin-walled rear wall extending downwardly from said rear termination;*

*c) a forward edge of said ramp surface being perpendicular to a direction of extent of said ramp surface, comprising a lowermost structure of said ramp and allowing access to said ramp surface;*

*d) said portion of said ramp surface having a forward termination rearward of said forward edge and forward of said rear termination;*

*e) said ramp surface being accessible via said forward edge by a skate or skateboard sized to support an adult human being and moving in a direction aligned with said direction of extent of said ramp surface.*

*30. The ramp of claim 29, wherein said ramp is made of hard plastic.*

*31. The ramp of claim 30, wherein said plastic comprises ABS plastic.*

*32. The ramp of claim 29, wherein said ramp surface has a substantially uniform width.*

*33. The ramp of claim 29, wherein said ramp surface comprises a part cylinder.*

*34. The ramp of claim 33, wherein said ramp surface has a constant radius of about 9'.*

*35. A one-piece molded ramp, comprising:*

*a) a laterally elongated ramp surface comprising:*

*i) a transition surface extending rearwardly from a laterally elongated forward edge of said ramp surface to a rearward termination of said transition surface;*

*ii) a radiused laterally elongated concave ramp surface extending from said rearward termination of said transition surface rearwardly to a rear edge of said ramp;*

*b) side walls extending downwardly from lateral terminations of said ramp surface and a rear wall extending downwardly from said rear edge of said ramp;*

*c) each of said side walls and rear wall being reinforced;*

*d) lateral supports extending laterally from a lower edge of each side wall and rearwardly from a lower edge of said rear wall;*

*e) said forward edge of said ramp surface extending forward of said lateral supports;*

*f) said forward edge of said ramp surface comprising a lowermost structure of said ramp and allowing access to said transition surface.*

*36. The ramp of claim 35, wherein said radiused concave ramp surface is smooth.*

*37. The ramp of claim 35, wherein said transition surface is non-radiused.*

*38. The ramp of claim 35, wherein said ramp surface has a substantially uniform width.*

*39. The ramp of claim 35, wherein said ramp is made of plastic.*

*40. The ramp of claim 35, wherein said ramp surface comprises a part cylinder.*

*41. The ramp of claim 35, wherein said lateral supports have an undersurface covered with a gripping material.*

*42. A one-piece hollow molded ramp, comprising:*

*a) a ramp surface comprising:*

*i) an unribbed transition surface extending rearwardly from a laterally elongated forward edge of said ramp surface to a rearward termination of said transition surface;*

*ii) a radiused laterally elongated concave unribbed ramp surface extending from said rearward termination of said transition surface rearwardly to a rear edge of said ramp;*

*b) thin-walled side walls extending downwardly adjacent lateral terminations of said ramp surface and a thin-walled rear wall extending downwardly adjacent said rear edge of said ramp;*

*c) said forward edge of said ramp surface comprising a lowermost structure of said ramp and allowing access to said transition surface.*

*43. The ramp of claim 42, wherein said ramp is made of hard plastic.*

*44. The ramp of claim 42, wherein said ramp surface has a substantially uniform width.*

*45. The ramp of claim 42, wherein said ramp surface comprises a part cylinder.*

*46. The ramp of claim 42, wherein said transition surface is non-radiused.*

* * * * *